United States Patent
Okamoto et al.

(10) Patent No.: US 10,608,227 B2
(45) Date of Patent: Mar. 31, 2020

(54) ELECTRICITY STORAGE MODULE

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventors: Ryoya Okamoto, Mie (JP); Hiroomi Hiramitsu, Mie (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 451 days.

(21) Appl. No.: 15/021,505

(22) PCT Filed: Sep. 4, 2014

(86) PCT No.: PCT/JP2014/073301
§ 371 (c)(1),
(2) Date: Apr. 21, 2016

(87) PCT Pub. No.: WO2015/037505
PCT Pub. Date: Mar. 19, 2015

(65) Prior Publication Data
US 2016/0233476 A1 Aug. 11, 2016

(30) Foreign Application Priority Data

Sep. 13, 2013 (JP) ................................. 2013-190408

(51) Int. Cl.
*H01M 2/20* (2006.01)
*H01G 11/76* (2013.01)
(Continued)

(52) U.S. Cl.
CPC ............ *H01M 2/202* (2013.01); *H01G 11/12* (2013.01); *H01G 11/76* (2013.01); *H01G 11/82* (2013.01);
(Continued)

(58) Field of Classification Search
CPC .... H01M 2/202; H01M 2/21016; H01M 2/30; H01M 10/0525; H01M 10/0585; H01G 11/12; H01G 11/76; H01G 11/82
(Continued)

(56) References Cited

U.S. PATENT DOCUMENTS

2011/0076521 A1* 3/2011 Shimizu ............. H01M 2/1061
429/7
2012/0094161 A1* 4/2012 Zheng ................... H01M 2/024
429/94
(Continued)

FOREIGN PATENT DOCUMENTS

JP     2006210116 A    8/2006
JP     2012138261 A    7/2012
(Continued)

OTHER PUBLICATIONS

International Search Report and Written Opinion for Application No. PCT/JP2014/073301 dated Oct. 28, 2014, 7 pages.
(Continued)

*Primary Examiner* — Cynthia H Kelly
*Assistant Examiner* — Rashid A Alam
(74) *Attorney, Agent, or Firm* — Reising Ethington, P.C.

(57) ABSTRACT

An electricity storage module includes a layered object obtained by layering power storage elements each having positive and negative foil-shaped lead terminals that project in an outward direction from an end portion, and connection members that connect the lead terminals of adjacent power storage elements to each other. An insulating holding mem-
(Continued)

ber is arranged between the layered object and the connection members. Connection member holding portions that hold the connection members are provided on the insulating holding member, and slits are provided on the insulating holding member so as to extend along edge portions of the connection members. The lead terminals are connected to the connection members by being inserted through the slits and folded over onto the connection members.

10 Claims, 13 Drawing Sheets

(51) Int. Cl.
*H01M 2/10* (2006.01)
*H01G 11/12* (2013.01)
*H01G 11/82* (2013.01)
*H01M 2/30* (2006.01)
*H01M 10/0525* (2010.01)
*H01M 10/0585* (2010.01)

(52) U.S. Cl.
CPC .......... *H01M 2/1016* (2013.01); *H01M 2/30* (2013.01); *H01M 10/0525* (2013.01); *H01M 10/0585* (2013.01); *Y02E 60/13* (2013.01)

(58) Field of Classification Search
USPC .......................................................... 429/90
See application file for complete search history.

(56) References Cited

U.S. PATENT DOCUMENTS

2014/0023909 A1* 1/2014 Suzuki ................. H01M 2/206
429/158
2014/0295225 A1* 10/2014 Okamoto ............. H01M 2/206
429/65

FOREIGN PATENT DOCUMENTS

| JP | 2013051100 A | 3/2013 |
| JP | 2013229266 A | 11/2013 |
| WO | WO2012131801 A1 | 10/2012 |

OTHER PUBLICATIONS

English Translation of International Search Report for Application No. PCT/JP2014/073301 dated Oct. 28, 2014, 2 pages.

* cited by examiner

ELECTRICITY STORAGE MODULE

CROSS REFERENCE TO RELATED APPLICATIONS

This application claims the priority of Japanese patent application JP2013-190408 filed on Sep. 13, 2013, the entire contents of which are incorporated herein.

TECHNICAL FIELD

The present invention relates to an electricity storage module.

BACKGROUND ART

Secondary batteries such as lithium ion batteries and nickel hydrogen batteries are known as examples of a storage battery that has a power generation element housed inside. A battery module is constituted by connecting multiple secondary batteries such as lithium ion batteries. A known example of such a battery module is disclosed in Patent Document 1, for example.

CITATION LIST

Patent Documents

Patent Document 1: JP 2012-138261A

SUMMARY OF INVENTION

Technical Problem

Patent Document 1 discloses a battery module obtained by layering multiple laminate electric cells in which positive and negative foil-shaped lead terminals project from end portions. In such a battery module, adjacent electric cells are electrically connected by connecting lead terminals that have different polarities (opposite polarities) to each other. The lead terminals are connected to each other by, for example, laying the end portions of the lead terminals directly over each other and then performing ultrasonic welding.

However, foil-shaped lead terminals such as those described above are thin and have an unstable shape, and therefore there have been problems such as that breakage occurs due to excessive force being applied during the connection task, it is not easy to obtain a constant connection state, and workability and connection reliability are not good. Note that the above problems can occur also in the case where adjacent electric cells are connected to each other by connecting lead terminals having the same polarity to each other.

The present application was achieved in light of the above-described situation, and a potential object thereof is to provide an electricity storage module that has superior connection workability and reliability.

Solution to Problem

An electricity storage module of the present application that was achieved in order to resolve the above issues includes: a layered object obtained by layering a plurality of power storage elements each having positive and negative foil-shaped lead terminals that project in an outward direction from an end portion; connection members that each connect the lead terminals of adjacent power storage elements to each other; and an insulating holding member that is arranged between the layered object and the connection members, has connection member holding portions that hold the connection members on a surface on a side opposite to a surface that opposes the layered object, and has slits provided so as to extend along edge portions of the connection members held by the connection member holding portions, wherein the lead terminals are connected to the connection members by being inserted through the slits and folded over onto the connection members.

According to the above-described electricity storage module, the foil-shaped lead terminals are connected to the connection members by being drawn out to the connection member side through the slits provided in the insulating holding member and folded over onto the connection members. The connection members are in a stable state of being held on one surface side of the insulating holding member (the surface on the side opposite to the surface that opposes the layered object) at this time, and therefore the connection task is easier than in a conventional configuration in which flexible and easily-deformed foil electrodes are connected by being directly laid over each other. Also, if laser welding is performed from directly above the foil electrodes that have been bent over onto the connection members, workability is better than when using a method of sandwiching foil electrodes between a pair of horns and performing welding as in conventional technology. Furthermore, due to workability being superior in this manner, connection reliability also improves.

In the above configuration, the power storage elements may be layered such that the lead terminals are arranged in pairs of equal polarity the pairs of lead terminals being arranged with alternating polarities, the connection members may each have a shape in which a first connection portion and a second connection portion that are provided parallel with each other are coupled by coupling portions at respective end portions, and adjacent lead terminals having the same polarity may be connected in parallel by the first connection portions and the second connection portions, and lead terminals that have different polarities and are connected in parallel in a first connection portion and a second connection portion may be connected in series by the coupling portions.

With this configuration, a high-output electricity storage module can be provided with a simple configuration.

The connection member holding portions may be wall portions provided so as to extend along the edge portions of the connection members. Alternatively, the connection member holding portions may be elastic locking pieces capable of locking the edge portions of the connection members.

Also, insertion guide portions for guiding insertion of the lead terminals into the slits may be provided in opening edge portions of the slits on a side that opposes the layered object. Workability during connection is further improved by these insertion guide portions.

Furthermore, voltage detection lines may be connected to the connection members.

Advantageous Effects

According to one aspect of the present invention, it is possible to obtain an electricity storage module that has superior reliability and workability in the task of connecting lead terminals to each other.

DESCRIPTION OF EMBODIMENTS

A first embodiment applied to a battery module 10 (one example of an electricity storage module) will be described below using FIGS. 1 to 13. In the following description, the terms up and down respectively refer to the top and bottom in FIG. 2, and the terms front and back respectively refer to the left side and right side of FIG. 3.

Figure 1:
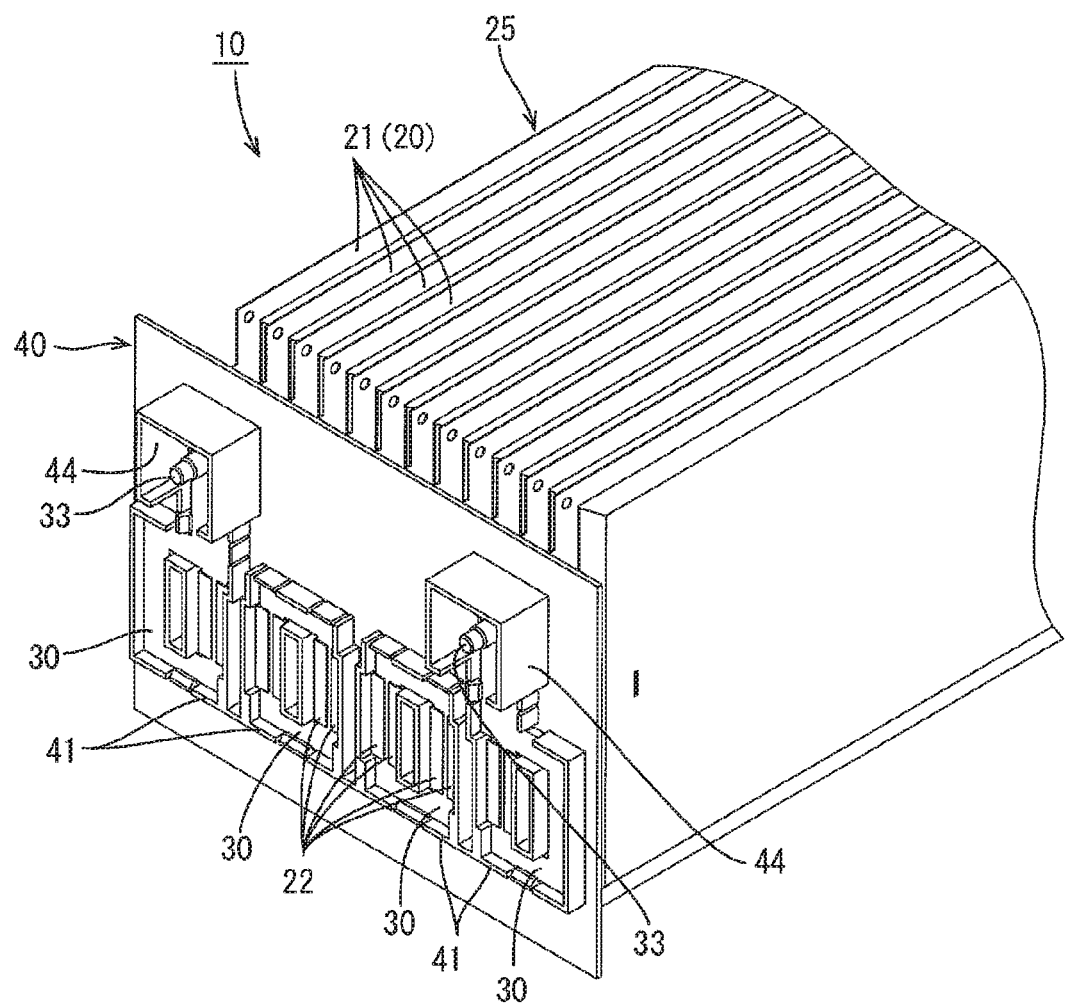
FIG. 1 is a perspective view of a battery module according to a first embodiment.

As shown in FIG. 1, the battery module 10 has an approximately rectangular parallelepiped shape overall, and includes a layered object 25 (or stack) obtained by layering (or stacking) multiple electric cells 20 (12 electric cells 20 in the present embodiment), a bus bar holding plate 40 (one example of an insulating holding member) arranged so as to cover, with one member, the front surface of the layered object 25, and bus bars 30 (one example of a connection member) that are held by the bus bar holding plate 40. The bus bar holding plate 40 is arranged between the layered object 25 and the bus bars 30.

Figure 4:
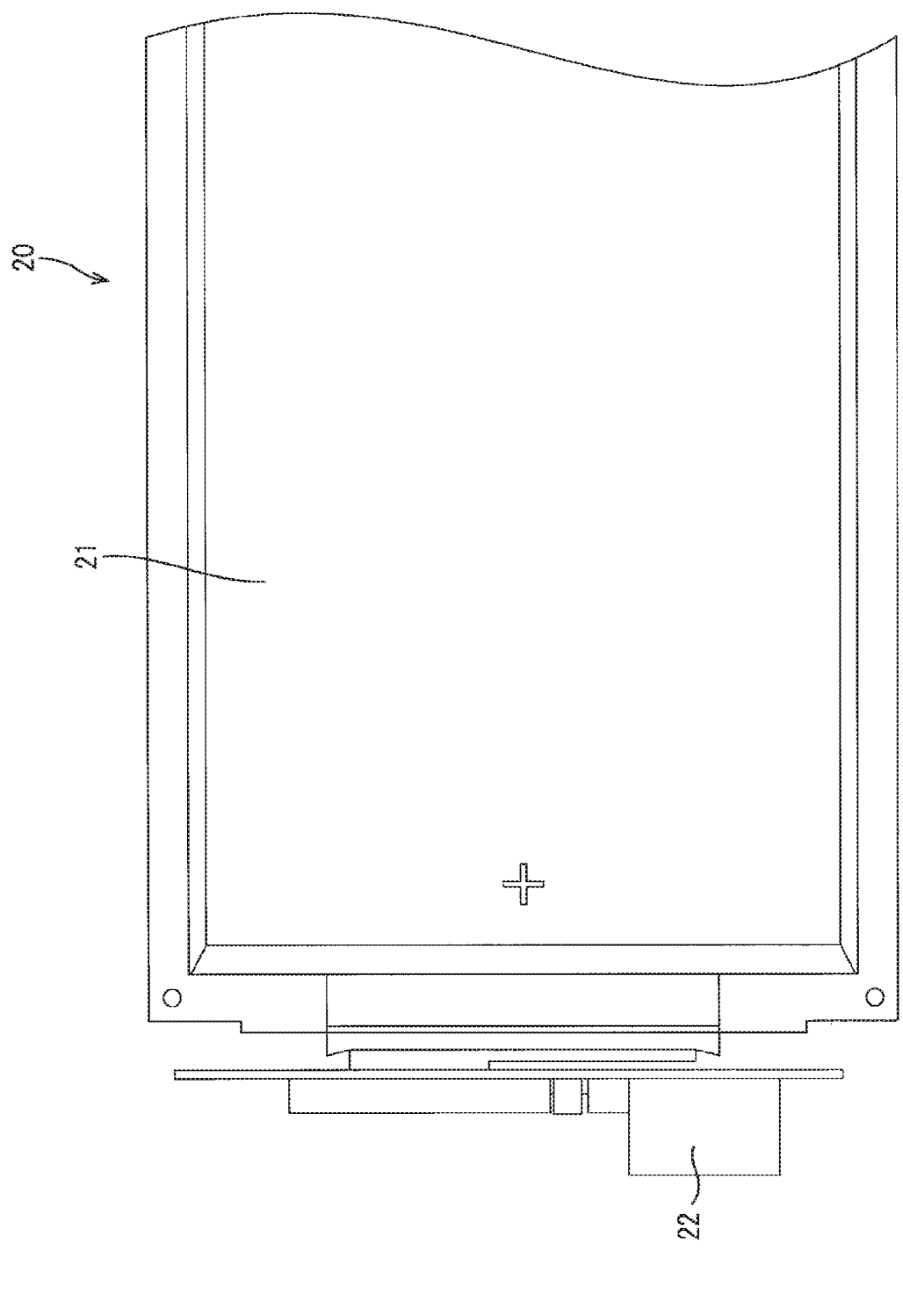
FIG. 4 is a side view of an electric cell.

Each electric cell 20 (one example of a power storage element) in the present embodiment is a laminate battery and is shaped as an approximately rectangular plate overall as shown in FIG. 4. Each electric cell 20 has a battery body 21 obtained by wrapping a power generation element (not shown) in a laminate film and welding the edge portion, and a pair of foil-shaped lead terminals 22 that are connected to the power generation element and project outward from the edge portion of the battery body 21 in mutually opposite direction along the lengthwise axis direction. The lead terminals 22 project from positions shifted downward from the central position in the vertical direction of the electric cell 20 in FIG. 4.

The electric cells 20 are layered with their outer side surfaces that have the larger area arranged on the left and right, thus constituting the layered object 25 (see FIG. 1). The electric cells 20 are arranged such that lead terminals 22 having different polarities are arranged at opposing positions in every second pair of electric cells 20 that are adjacent in the layering direction.

Figure 5:
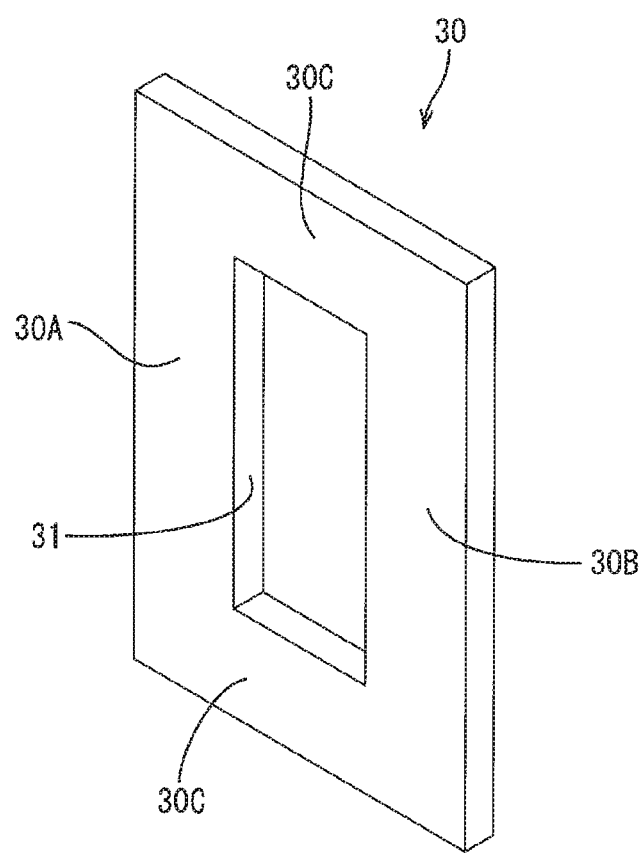
FIG. 5 is a perspective view of a bus bar.
Figure 6:
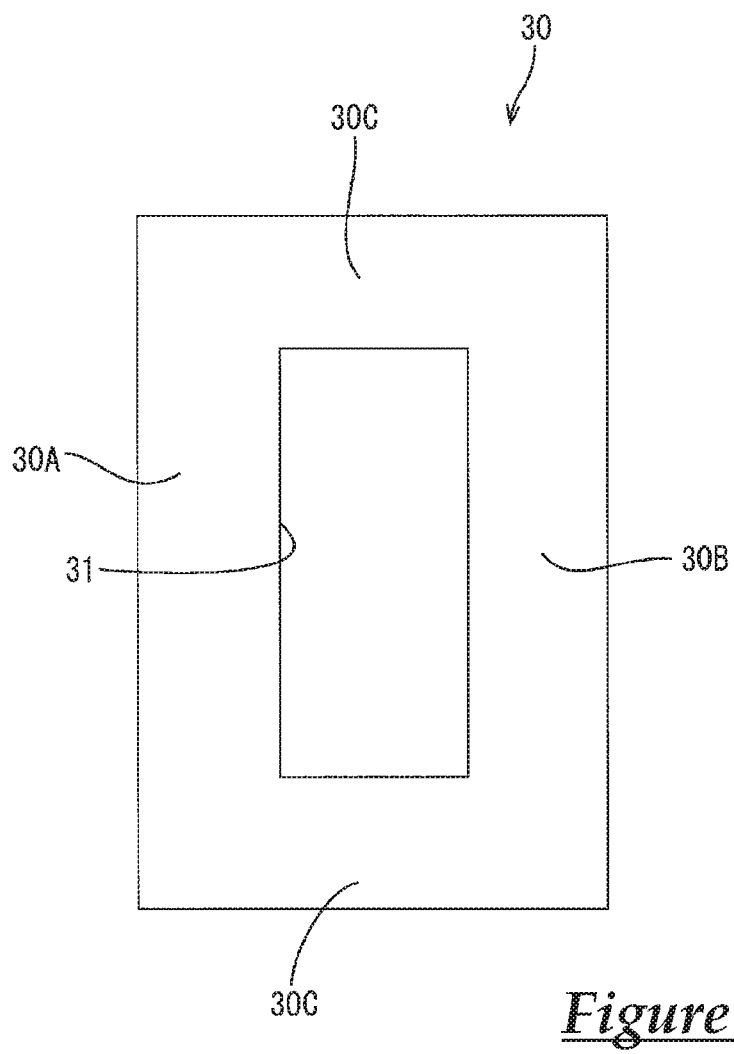
FIG. 6 is a plan view of the bus bar.
Figure 7:
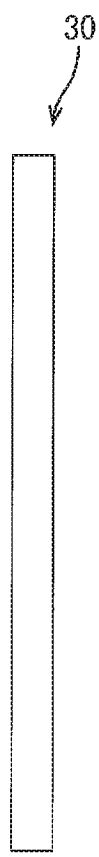
FIG. 7 is a side view of the bus bar.

The bus bars 30 are each made of a metallic electrically conductive material such as pure aluminum, an aluminum alloy, copper, or a copper alloy. In the present embodiment, the bus bar 30 is approximately shaped as a frame that has a rectangular hole portion 31 in the central portion of an approximately rectangular plate-shaped member. More specifically, as shown in FIGS. 5 to 7, the bus bar 30 is constituted by a first connection portion 30A that extends in the vertical direction and is arranged on the left side in the center of FIG. 6, a second connection portion 30B that extends in the vertical direction and is arranged on the right side, and a pair of coupling portions 30C that respectively couple the two upper end portions and the two lower end portions of the first connection portion 30A and the second connection portion 30B. The first connection portion 30A and the second connection portion 30B are arranged parallel to each other. Also, the pair of coupling portions 30C are also arranged parallel to each other.

Among the bus bars 30 (four of them in the present embodiment), the bus bars 30 arranged at the two end portions (the left and right end portions in FIG. 2) of the battery module 10 are each provided with an extension portion 32 that extends upward in the lengthwise direction. A stud bolt 33 for connection to an external device (not shown) is provided so as to protrude outward (forward) in the vicinity of the end portion of each of the extension portions 32. The stud bolts 33 have an approximately circular column shape and are fixed to the extension portions 32 of the bus bars 30 by a means such as welding or press fitting.

The bus bar holding plate 40 is a plate-shaped member made of an insulating resin, and as shown in FIG. 1, is arranged so as to cover, with one member, the front surface of the layered object 25, and is positioned between the battery bodies 21 and the bus bars 30. The bus bar holding plate 40 has holding walls 41 (one example of a wall portion) on the surface on the side opposite to the surface that opposes the layered object 25 (on the surface on which the bus bars 30 are arranged), and the holding walls 41 rise perpendicularly upward from this plate surface and are for positioning and holding the bus bars 30 on the plate surface.

Figure 2:
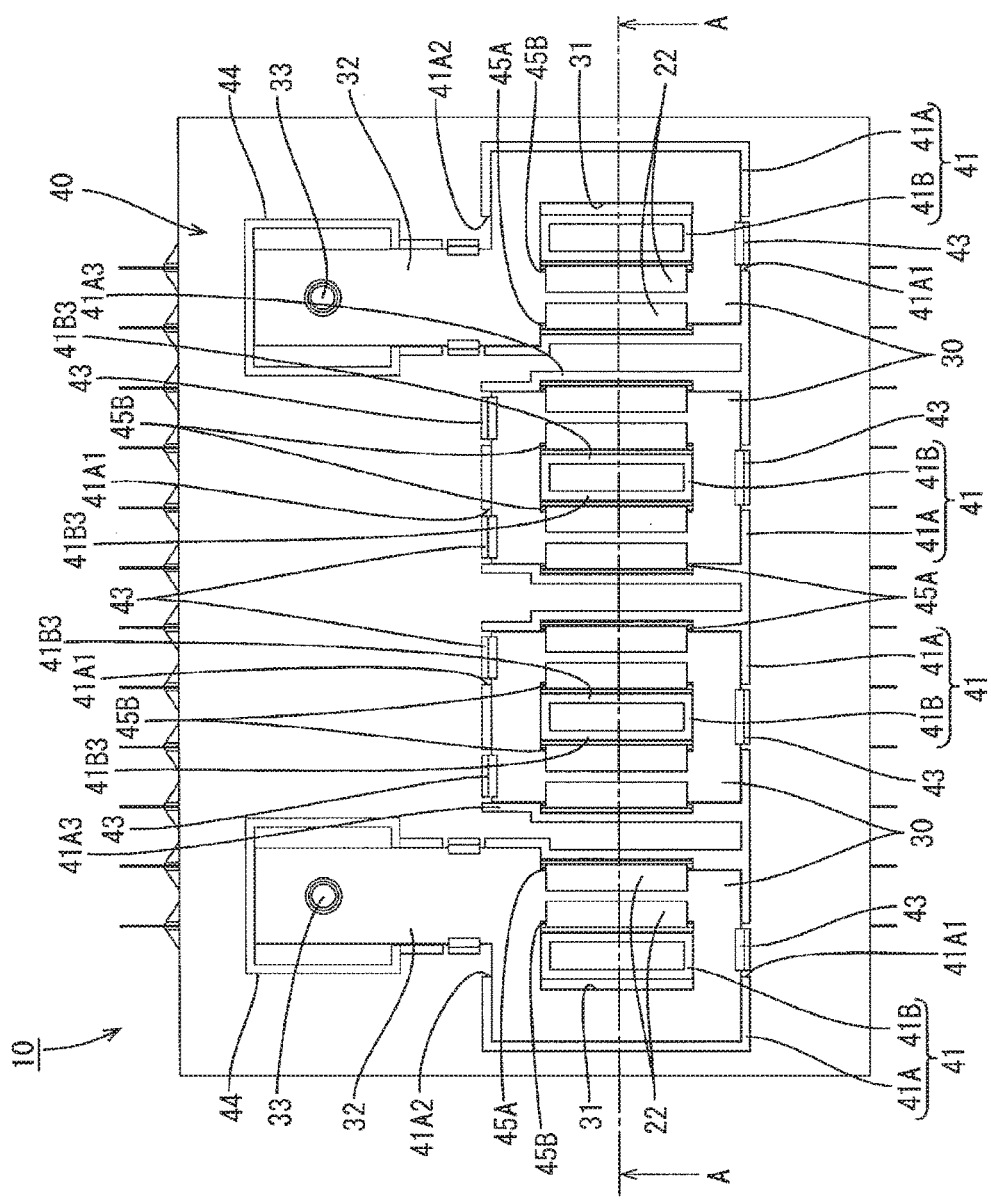
FIG. 2 is a front view of the battery module.
Figure 3:
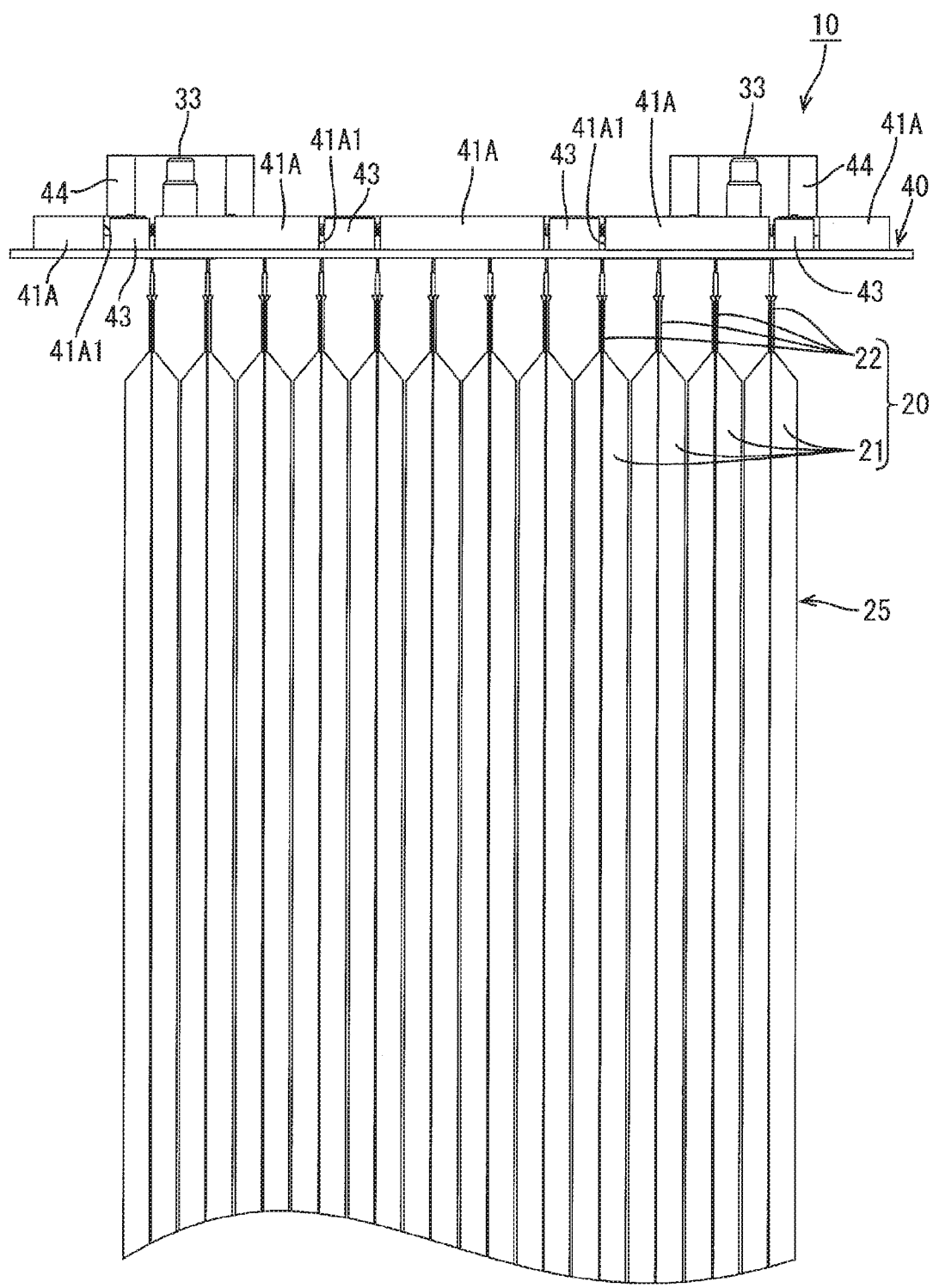
FIG. 3 is a bottom view of the battery module.
Figure 8:
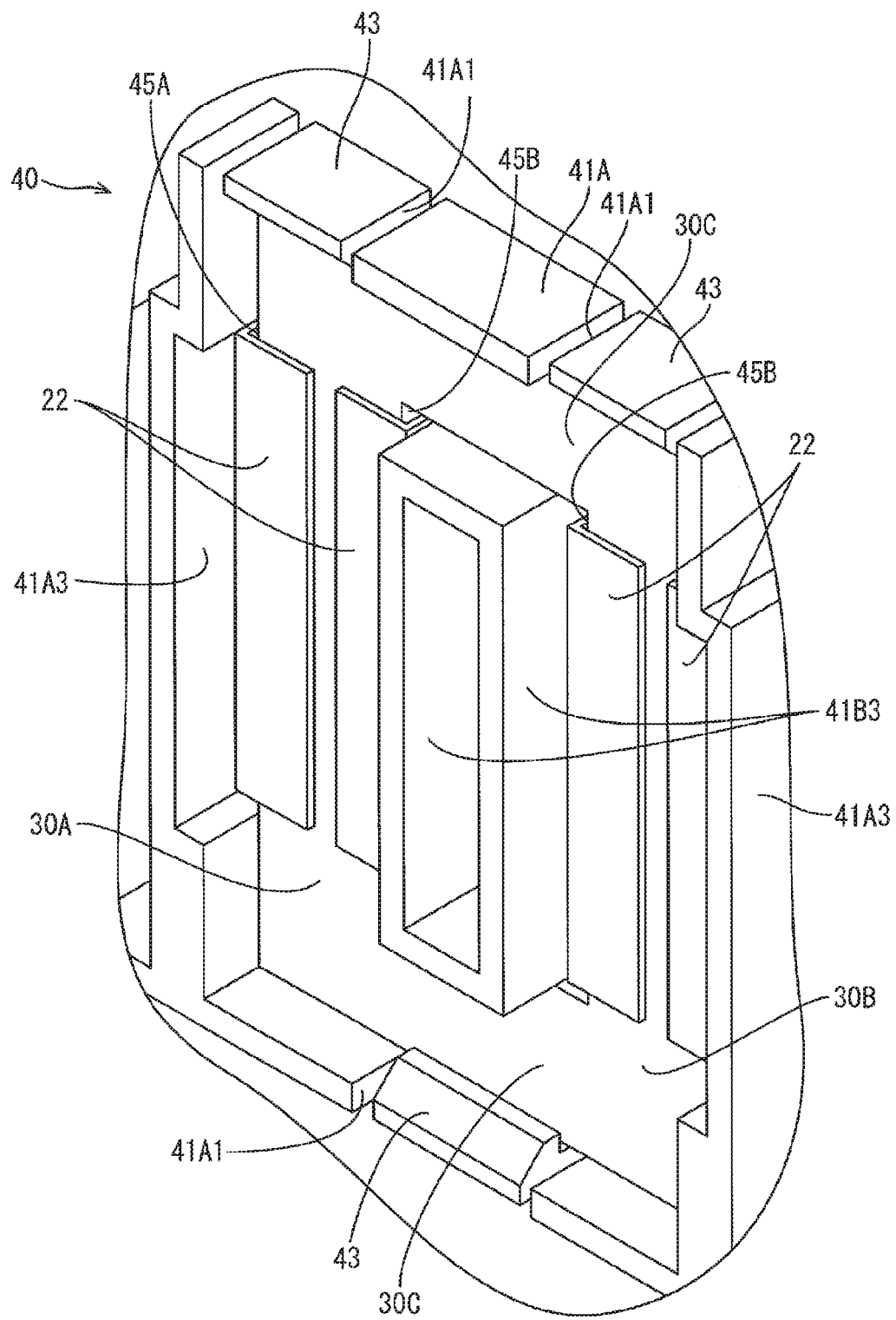
FIG. 8 is an enlarged perspective view of a portion of the battery module.
Figure 9:
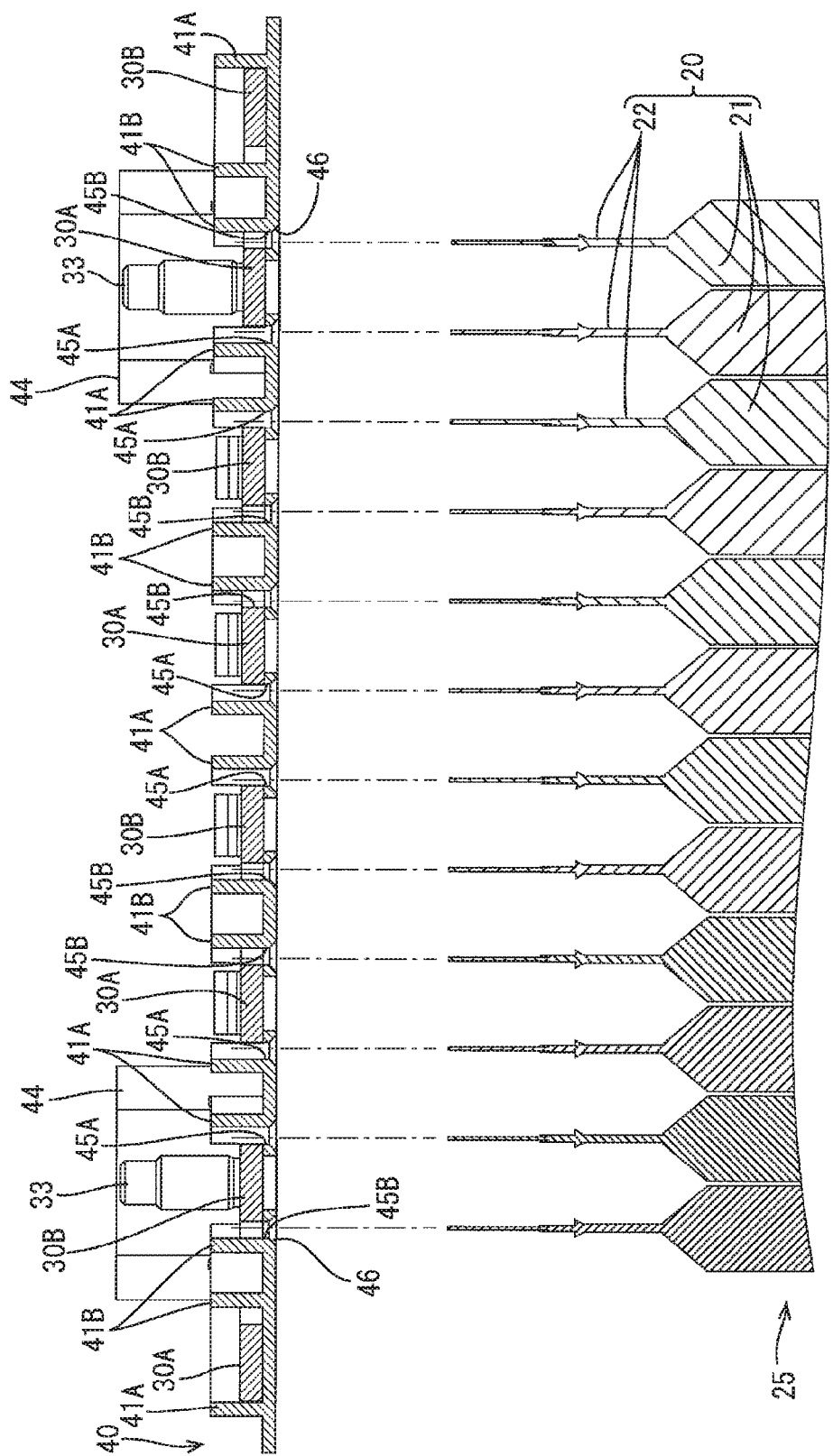
FIG. 9 is a cross-sectional view taken along A-A in FIG. 2 and shows the state before assembly of the battery module.

As shown in FIGS. 2 and 8, the holding walls 41 have four outer peripheral walls 41A that rise along the outer peripheral shape of the bus bars 30 so as to surround the peripheries thereof, and four inner peripheral walls 41B that are provided at positions inward of the outer peripheral walls 41A and rise along the edge portions of the hole portions 31 of the bus bars 30. Portions of the outer peripheral walls 41A have been cut out at some locations, and elastic locking pieces 43, which are for locking the bus bars 30 in the holding walls 41 to achieved a retained state, are provided upright in these cut-out portions 41A1.

Note that an escape portion 41A2 for allowing the escape of the above-described extension portion 32 of the bus bar 30 is provided in a portion of each of the outer peripheral walls 41A arranged at the two end portions (the left and right end portions in FIG. 2) of the battery module 10 among the four outer peripheral walls 41A. The extension portions 32 of the bus bars 30 are arranged so as to extend upward in FIG. 2 from the escape portions 41A2. The bus bar holding plate 40 is provided with protection walls 44 that project in a square shape so as to surround the upper end portions of the extension portions 32 (the peripheries of the stud bolts 33). The amount of protrusion of the protection walls 44 from the plate surface of the bus bar holding plate 40 is set larger than the amount of protrusion of the holding walk 41, thus making it possible to protect the outer periphery of the stud bolts 33 (see FIG. 3).

Inner slits 45B are formed in the bus bar holding plate 40 at locations outward of a pair of those rising walls 41B3, out of the inner peripheral walls 41B, that oppose each other and extend in the vertical direction in FIG. 8, and the inner slits 45B extend along the pair of rising walls 41B3. The lengths of the inner slits 45B are equivalent to the lengths of the pair of rising walls 41B3 among the inner peripheral walls 41B (see FIG. 2).

Also, outer slits 45A are formed in the bus bar holding plate 40 at locations inward of a pair of those rising walls 41A3, out of the outer peripheral walls 41A, that extend in the vertical direction in FIG. 8, and the outer slits 45A extend along the pair of rising walls 41A3. The outer slits 45A are provided at positions opposing the inner slits 45B, and the lengths thereof are equivalent to the inner slits 45B. Also, the outer peripheral walls 41A are formed so as to bulge outward in the portions in which the outer slits 45A are formed, so as to not be overlapped with the outer slits 45A.

Note that the outer slits 45A are not formed inward of those rising walls 41A3, out of the outer peripheral walls 41A, that are located at the two end portions (the left and right end portions in FIG. 2) of the battery module 10 (see FIG. 2).

These outer slits 45A and inner slits 45B are set in advance so as to be arranged at positions along the edge portions of the bus bars 30 in the state where the bus bars 30 are held by the bus bar holding plate 40.

Figure 12:
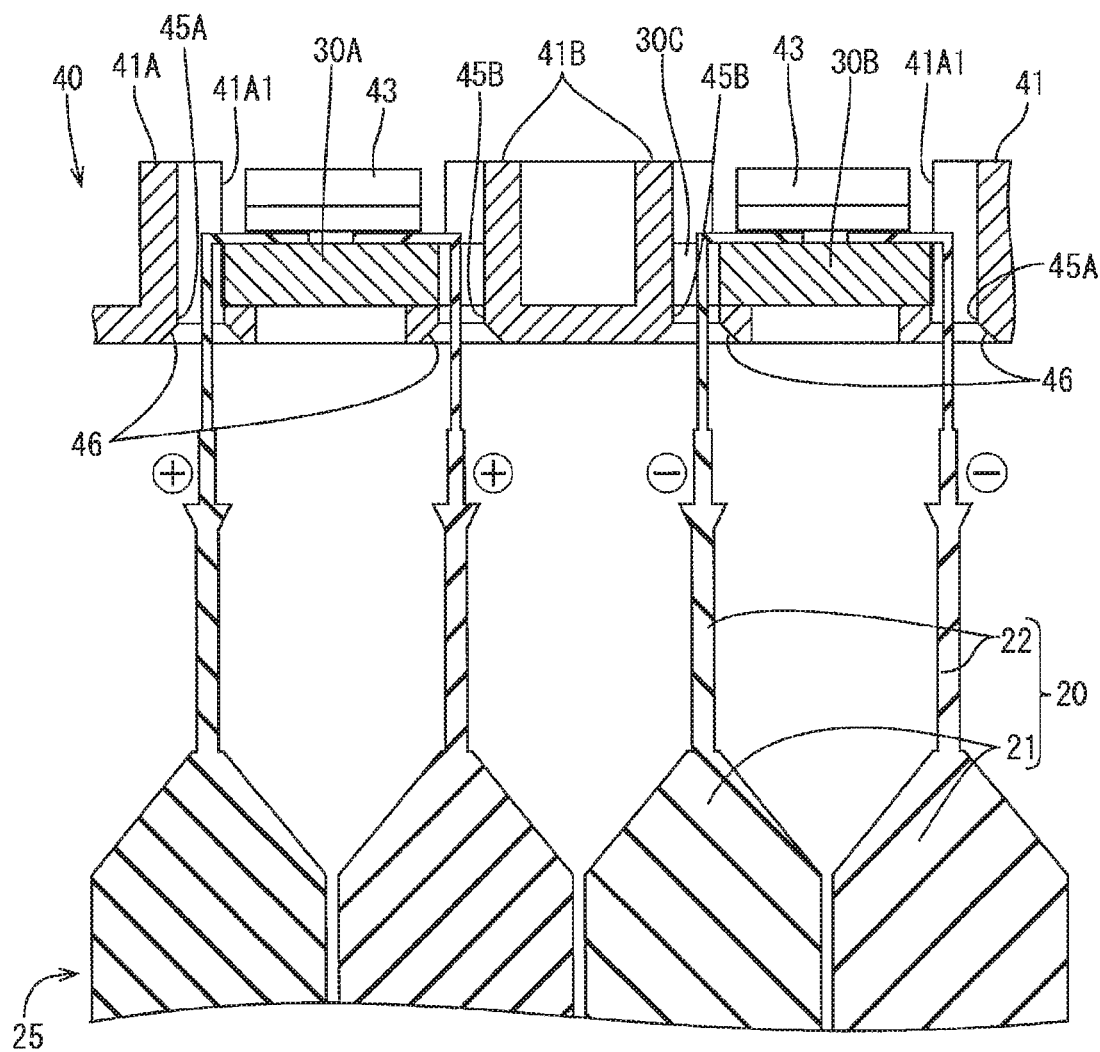
FIG. 12 is an enlarged cross-sectional view of a portion of FIG. 11.
Figure 13:
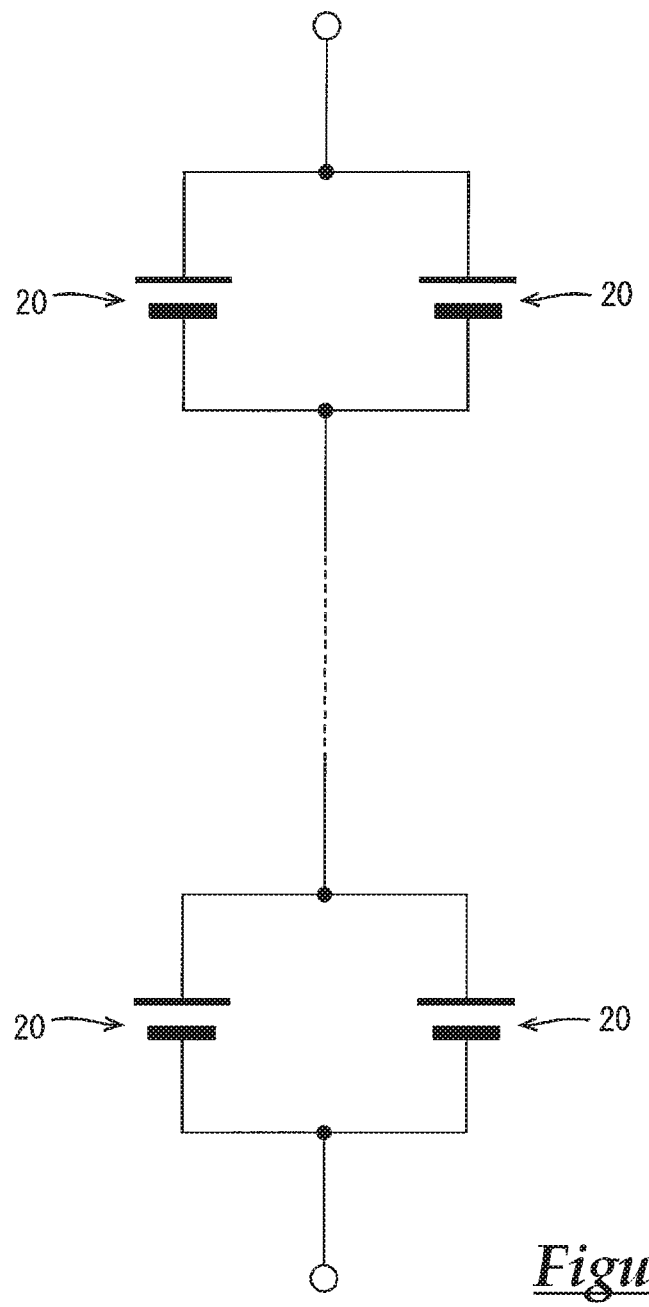
FIG. 13 is a conceptual diagram showing the connected state of electric cells.

Opening edge portions of the above-described outer slits 45A and inner slits 45B on the side that opposes the layered object 25 (battery bodies 21) expand diagonally and serve as insertion guide portions 46 for guiding insertion of the lead terminals 22 (see FIG. 12).

Next, a method for assembling the battery module 10 of the present embodiment will be described. First, the layered object 25 is produced by layering 12 of the electric cells 20 shown in FIG. 4 such that the electrodes of the lead terminals 22 have different polarities in every second pair of adjacent electric cells 20.

Also, the bus bars 30 are fixed at predetermined positions on the bus bar holding plate 40. Specifically, the frame-shaped bus bars 30 are fitted inside the outer peripheral walls 41A of the bus bar holding plate 40. Then the inner peripheral walls 41B of the bus bar holding plate 40 are arranged inside the hole portions 31 of the bus bars 30 by being fitted therein so as to follow the edge portions of the hole portions 31. Also, when the bus bars 30 are fitted, the elastic locking pieces 43 provided in the cut-out portions 41A1 of the outer peripheral walls 41A are pressed by the bus bars 30 so as to undergo elastic deformation in the outward direction, and then undergo elastic restoration when the bus bars 30 are arranged at the predetermined positions, thus locking the edge portions of the bus bars 30 and achieving a retained state.

Note that the bus bars 30 that are arranged at the two end portions of the battery module 10 and have the extension portions 32 are also held at predetermined positions on the bus bar holding plate 40 in a manner similar to the above description.

Figure 10:
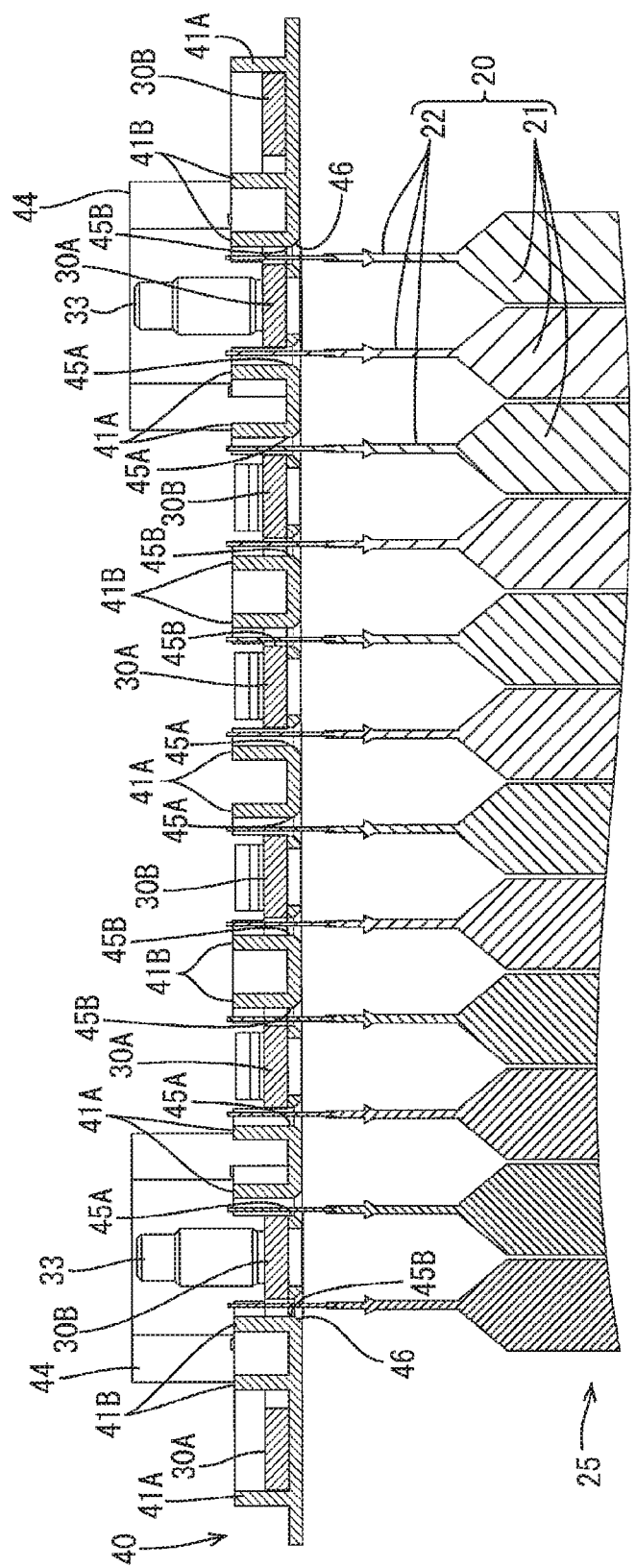
FIG. 10 is a cross-sectional view taken along A-A in FIG. 2 and shows the battery module assembly process.

Next, the bus bar holding plate 40 with the bus bars 30 fixed thereto is arranged in front of the layered object 25 (see FIG. 9), and the lead terminals 22 of the electric cells 20 are inserted into the respective slits 45A and 45B (see FIG. 10). By using a positioning jig or the like at this time, the lead terminals 22 can be inserted into the slits 45A and 45B with a given insertion amount. Also, due to providing the insertion guide portions 46 in the slits 45A and 45B, the lead terminals 22 are smoothly guided into the slits 45A and 45B.

Figure 11:
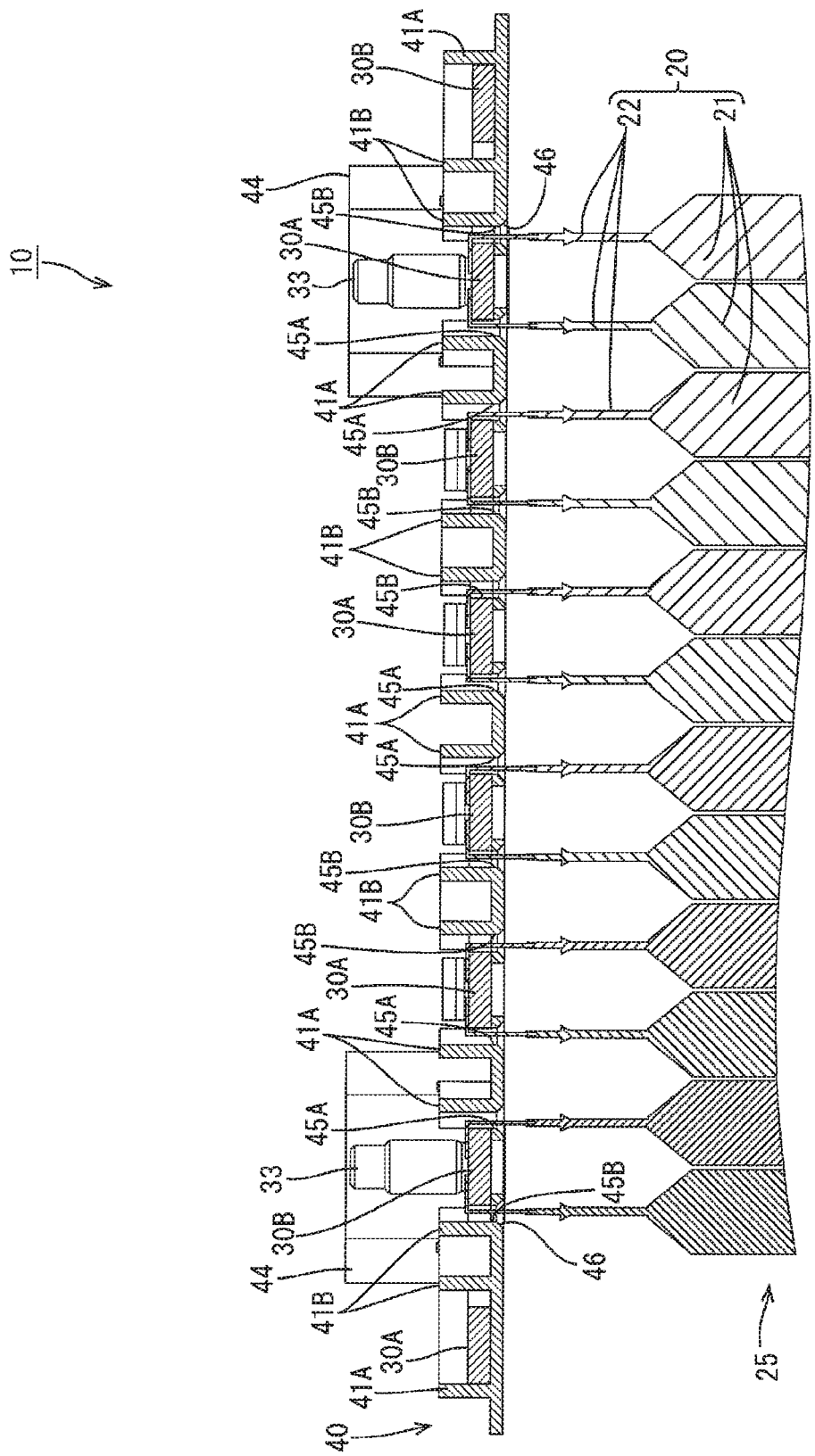
FIG. 11 is a cross-sectional view taken along A-A in FIG. 2 and shows the battery module in the assembled state.

Next, as shown in FIGS. 11 and 12, the portions of the lead terminals 22 that have passed through the slits 45A and 45B and project outward on the front side of the bus bar holding plate 40 (the upper side in FIGS. 11 and 12) are bent and overlaid on the bus bars 30. More specifically the lead terminals 22 that were inserted through the outer slits 45A are bent inward with respect to the bus bars 30, the lead terminals 22 that were inserted through the inner slits 45B are bent outward with respect to the bus bars 30, and the lead terminals 22 are overlaid on the bus bars 30.

Specifically as shown in FIG. 12, pairs of adjacent lead terminals 22 that have the same polarity are overlaid on the same connection portion (the first connection portion 30A or the second connection portion 30B), and are connected to each other in a parallel connection state. Also, pairs of lead terminals 22 that have different polarities and are connected in a parallel connection state in different connection portions (second connection portions 30B or first connection portions 30A) are connected to pairs of lead terminals 22 that have the same polarity in a series connection state by the coupling portions 30C. In other words, the electric cells 20 are connected in the state shown in FIG. 13.

Note that the lead terminals 22 in adjacently arranged pairs are set so as to not directly come into contact with each other on the bus bars 30.

The portions of the lead terminals 22 that are overlaid on the bus bars 30 are conductively connected to the bus bars 30 by laser welding. In this way, the battery module 10 is completed.

Also, although not shown, voltage detection lines are connected to the bus bars 30 by welding or brazing, and the voltage detection lines are bundled together.

Next, actions and effects of the present embodiment will be described.

In the present embodiment, the foil-shaped lead terminals 22 are connected to the bus bars 30 by being drawn to the bus bar 30 side through the outer slits 45A and the inner slits 45B provided in the bus bar holding plate 40 and then bent over onto the bus bars 30. The bus bars 30 are constituted by plate-shaped members and also in a stable state of being held on one surface side of the bus bar holding plate 40, and therefore the flexible and easily-deformed lead terminals 22 do not become deformed or shifted in position even when they are bent over, and the connection task is easy. Also, laser welding can be performed directly on the lead terminals 22 on the bus bars 30, thus achieving excellent workability.

Also, the lead terminals 22 of the electric cells 20 are configured such that adjacent lead terminals 22 that have the same polarity are connected in parallel by the first connection portions 30A and the second connection portions 30B of the approximately frame-shaped bus bars 30, and lead terminals 22 that have different polarities and are respectively connected in parallel in a first connection portion 30A and a second connection portion 30B are connected in series by the coupling portions 30C, and thus the high-output battery module 10 can be obtained with a simple configuration.

Furthermore, the insertion guide portions 46 are provided in the opening edge portions of the outer slits 45A and the inner slits 45B on the side opposing the layered object 25, thus improving workability when inserting the lead terminals 22 into the slits 45A and 45B.

According to the present embodiment, it is possible to obtain the battery module 10 that has excellent reliability and workability in the task of connecting lead terminals 22 to each other.

The present invention is not limited to the embodiment described above using the foregoing description and drawings, and embodiments such as the following are also encompassed in the technical scope of the present invention.

(1) Although laminate electric cells 20 are shown as power storage elements in the above embodiment, the power storage elements may be other batteries, capacitors, or the like, which is to say that the present invention is applicable to various types of power storage elements that have foil-shaped lead terminals.

(2) Although frame-shaped bus bars 30 are shown as examples of connection members in the above embodiment, I-shaped members, for example, can be used as the bus bars. Also, the bus bars may be shaped such that one out of the pair of coupling portions 30C of the frame-shaped bus bar 30 is omitted.

(3) Although an example in which pairs of parallel-connected electric cells 20 are connected to each other in series is described in the above embodiment, a configuration is possible in which all of the electric cells 20 are connected in series.

(4) Although a configuration in which the holding walls 41 and the elastic locking pieces 43 for holding the bus bars 30 are provided on the bus bar holding plate 40 is employed in the above embodiment, a configuration is possible in which only either one of them is provided.

(5) Also, the configuration of the connection member holding portions is not limited to the above embodiment.

(6) Although the insulating holding member is plate-shaped in the above embodiment, another configuration such as being foil-shaped is also possible.

(7) Although a configuration in which the insertion guide portions 46 are provided at the opening edge portions of the slits 45 is employed in the above embodiment, the insertion guide portions 46 are not necessarily required.

(8) Although an example in which the lead terminals 22 and the bus bars 30 are laser welded is shown in the above embodiment, they may be connected by another welding technique such as resistance welding or ultrasonic welding, or a brazing technique such as soldering.

REFERENCE SIGNS LIST

10 Battery module (electricity storage module)
20 Electric cell (power storage element)
21 Battery body
22 Lead terminal
25 Layered object
30 Bus bar (connection member)
30A First connection portion
30B Second connection portion
30C Coupling portion
31 Hole portion
40 Bus bar holding plate (insulating holding member)
41 Holding wall (connection member holding portion/wall portion)
41A Outer peripheral wall
41B Inner peripheral wall
43 Elastic locking piece (connection member holding portion)
45 Slit
45A Outer slit
45B Inner slit
46 Insertion guide portion

The invention claimed is:

1. An electricity storage module comprising:
a layered object in which a plurality of power storage elements have a plurality of foil-shaped lead terminals, each power storage element has positive and negative foil-shaped lead terminals that project in an outward direction from an end portion and are layered such that the plurality of foil-shaped lead terminals are arranged in pairs of equal polarity, the pairs include one pair with first and second foil-shaped lead terminals and another pair with third and fourth foil-shaped lead terminals;
connection members that each connect the lead terminals of adjacent power storage elements to each other, and each have a shape in which a first connection portion and a second connection portion that are provided parallel with each other are coupled by coupling portions at respective end portions, at least one of the connection members has a hole portion being defined at least in part by an inner periphery of the first connection portion and an inner periphery of the second connection portion; and
an insulating holding member that is arranged between the layered object and the connection members, has connection member holding portions with holding walls that at least partially surround the connection members and hold the connection members on a surface on a side opposite to a surface that opposes the layered object, and has a plurality of slits provided so as to extend along edge portions of the connection members held by the connection member holding portions, the holding walls include one or more outer peripheral walls that rise along an outer periphery of the connection members and one or more inner peripheral walls that rise along an inner periphery of the connection members, the plurality of slits include a first slit defined between the one or more outer peripheral walls of the insulating holding member and the outer periphery of the connection member, a second slit defined between the one or more inner peripheral walls of the insulating holding member and the inner periphery of the connection member, a third slit defined between the one or more inner peripheral walls of the insulating holding member and the inner periphery of the connection member, and a fourth slit defined between the one or more outer peripheral walls of the insulating holding member and the outer periphery of the connection member,
wherein the plurality of foil-shaped lead terminals are connected to the connection members such that the first foil-shaped lead terminal is inserted through the first slit and is folded over onto the connection member, the second foil-shaped lead terminal is inserted through the second slit and is folded over onto the connection member, the third foil-shaped lead terminal is inserted through the third slit and is folded over onto the connection member, and the fourth foil-shaped lead terminal is inserted through the fourth slit and is folded over onto the connection member, and
adjacent lead terminals having the same polarity are connected in parallel by the first connection portions and the second connection portions, and lead terminals that have different polarities are connected in series by the coupling portions.

2. The electricity storage module according to claim 1, wherein the holding walls are provided so as to extend along the edge portions of the connection members.

3. The electricity storage module according to claim 1, wherein the connection member holding portions include elastic locking pieces capable of locking the edge portions of the connection members.

4. The electricity storage module according to claim 1, wherein insertion guide portions for guiding insertion of the first, second, third, and fourth lead terminals into the first, second, third, and fourth slits, respectively, are provided in opening edge portions of the first, second, third, and fourth slits on a side that opposes the layered object.

5. The electricity storage module according to claim 1, wherein voltage detection lines are connected to the connection members.

6. The electricity storage module according to claim 2, wherein insertion guide portions for guiding insertion of the first, second, third, and fourth lead terminals into the first, second, third, and fourth slits, respectively, are provided in opening edge portions of the first, second, third, and fourth slits on a side that opposes the layered object.

7. The electricity storage module according to claim 3, wherein insertion guide portions for guiding insertion of the first, second, third, and fourth lead terminals into the first, second, third, and fourth slits, respectively, are provided in opening edge portions of the first, second, third, and fourth slits on a side that opposes the layered object.

8. The electricity storage module according to claim 2, wherein voltage detection lines are connected to the connection members.

9. The electricity storage module according to claim 3, wherein voltage detection lines are connected to the connection members.

10. The electricity storage module according to claim 4, wherein voltage detection lines are connected to the connection members.

* * * * *